United States Patent

[11] 3,539,027

| [72] | Inventor | George H. Fathauer<br>Decatur, Illinois |
|---|---|---|
| [21] | Appl. No. | 761,153 |
| [22] | Filed | Sept. 20, 1968 |
| [45] | Patented | Nov. 10, 1970 |
| [73] | Assignee | Eaton Yale & Towne Inc.<br>Morton Grove, Illinois<br>a corporation of Ohio |

[54] INTEGRATING CONVEYORIZED WEIGHING SYSTEM
6 Claims, 3 Drawing Figs.

[52] U.S. Cl. .................................................. 177/16,
177/210
[51] Int. Cl. .................................................. G01g 11/14,
G01g 3/15
[50] Field of Search ........................................... 177/16,
210, 211, 119

[56] References Cited
UNITED STATES PATENTS

| 3,159,746 | 12/1964 | Powell et al. | 177/16X |
| 3,390,731 | 7/1968 | Schierbeek | 177/16 |

Primary Examiner—Robert S. Ward, Jr.
Attorney—Hill, Sherman, Meroni, Gross and Simpson ABSTRACT: A control circuit for a conveyorized weighing system having a load cell supporting a portion of the conveyor and having a DC signal output from the load cell as an indicator of the instantaneous loading of the conveyor. Time integrating means provided at the output of the load cell for developing a continually increasing signal. Triggering means are provided to be actuated when the signal on the integrating means reaches a desired magnitude. The triggering means then operates a counter and records a unit of weight. The actuation of the triggering means also restores the integrating means to its normal or no-load value, thereby allowing the cycle to repeat until the given magnitude is reached at the integrating means for once again triggering the counter to record a second unit of weight.

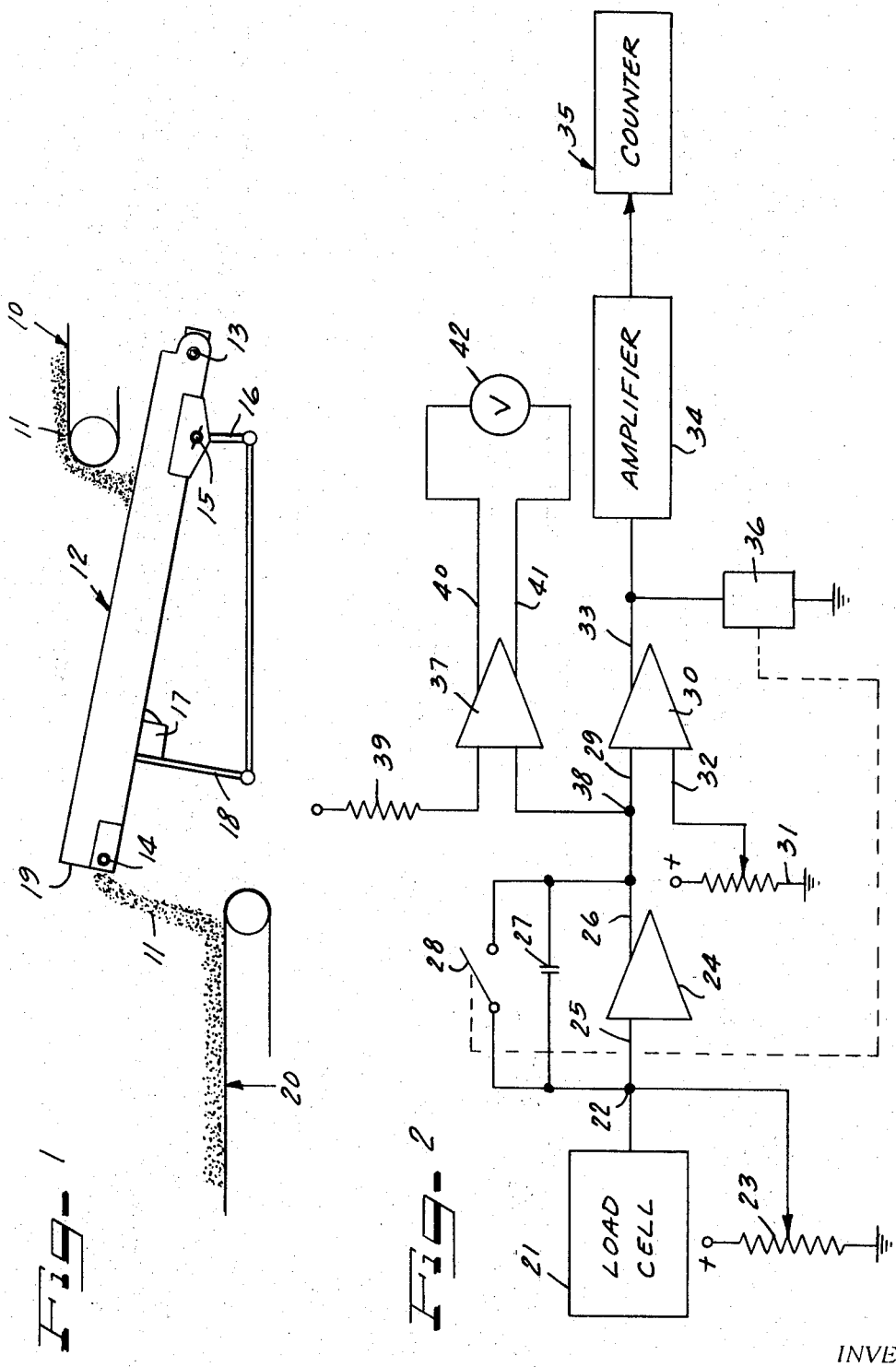

INVENTORS
GEORGE H. FATHAUER

3,539,027

INTEGRATING CONVEYORIZED WEIGHING SYSTEM

BACKGROUND OF THE INVENTION

Field of the Invention

The field of art to which this invention pertains is a conveyor system and in particular a means for continuously monitoring the weight of materials passing over a conveyor system moving at a constant rate of speed.

SUMMARY

It is an important feature of the present invention to provide an improved and efficient control circuit for measuring the total weight of materials passing along a conveyor system.

It is also a feature of the present invention to provide an improved load cell output circuit arrangement for use with an integrating circuit to measure the cumulative loading of a conveyor system over a specified period of time.

It is an object of the present invention to provide an improved integrating and counting circuit for use with a DC load cell output signal to register the weight of materials passing through a conveyor system.

It is another object of the present invention to provide a conveyorized weighing system having an oscillator input to a load cell wherein the oscillator circuit in part comprises the primary winding of the load cell output transformer.

It is another object of the present invention to provide a conveyorized weighing system wherein the load cell of the system has a DC output signal and wherein a DC balance signal is algebraically added to the load cell output signal to null out scale tare weight and wherein the combined DC signal is coupled to a capacitive integrating network to develop a continually increasing signal which is indicative of the total weight of materials moving past a specified point on the conveyor system.

It is also an object of the present invention to provide a conveyorized weighing system of the type described above wherein the means for triggering the integrating capacitor comprises a differential amplifier having an input coupled to the capacitor and having an output coupled to an electronic switching means for both registering a specified count when the state of operation of the differential amplifier switches and for substantially simultaneously discharging the integrating capacitor to repeat the counting cycle.

These and other objects, features and advantages of the present invention will be understood in greater detail from the following description and the associated drawings wherein reference numerals are utilized to designate an illustrative embodiment.

BRIEF DESCRIPTION OF THE DRAWINGS

FIG. 1 is a diagrammatic illustration of a conveyor system utilizing a load cell and an electronic control system according to the present invention;

FIG. 2 is a block diagram of an electronic integrating control system of the present invention.

DESCRIPTION OF THE PREFERRED EMBODIMENT

Figure 3:
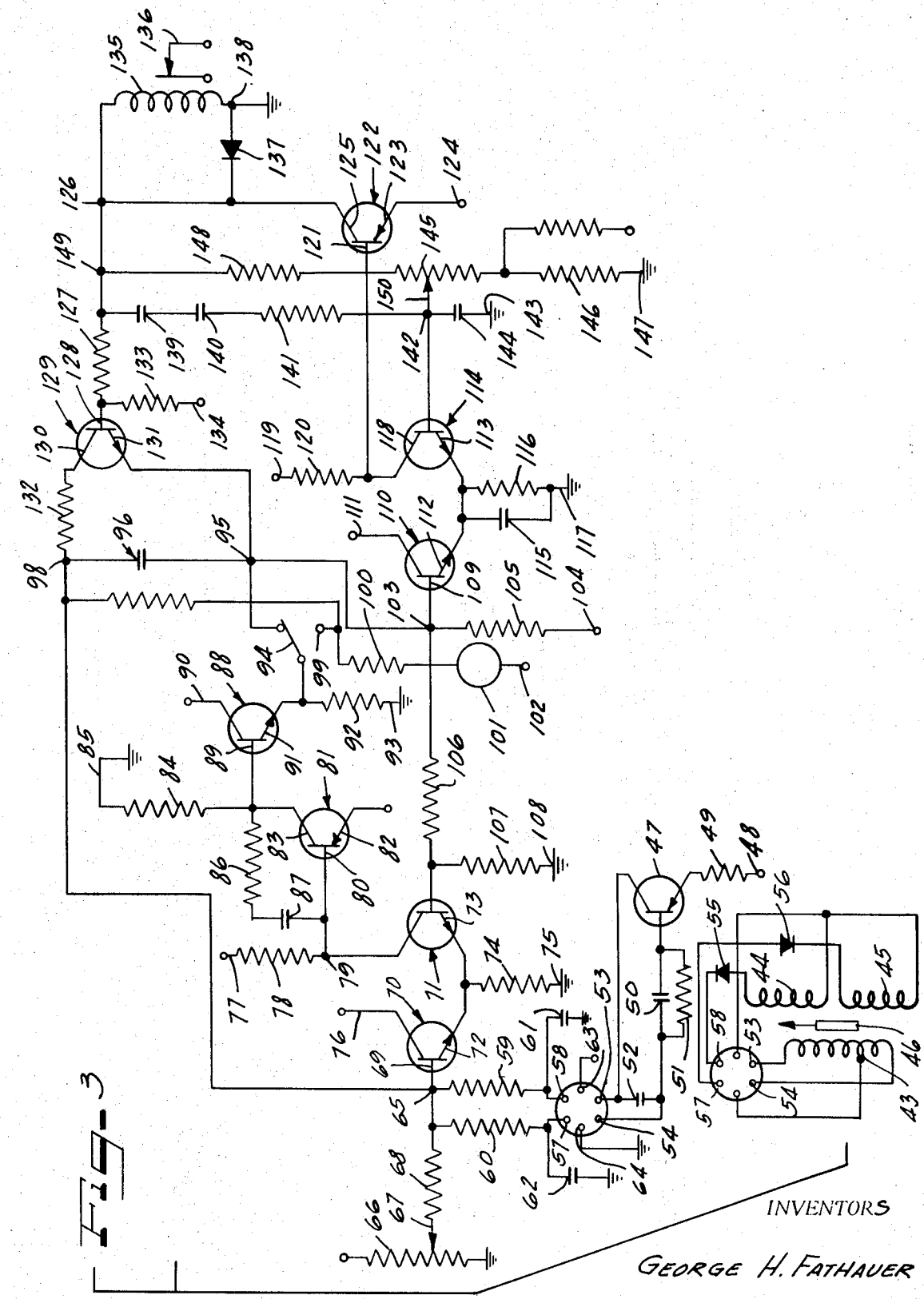
FIG. 3 is a schematic showing the details of the electronic circuitry of the control system of the present invention.

A conveyorized system according to the present invention is shown generally in FIG. 1 as including an input conveyor 10 having materials 11 moving along the surface thereof and being fed to a weigher conveyor unit 12. The conveyor unit 12 has an endless track which is rotated about pivot points 13 and 14. The track 12 is pivoted at 15 and is rigidly supported through a brace 16. The opposite end of the track is supported at a load cell 17 which in turn is supported by a brace 18.

Material moves along the track 12 and is passed from the end 19 thereof to a further conveyor mechanism 20. The material 11 may then be moved to its point of end use.

One of the features of the present invention is to utilize the load cell 17 to develop a signal which is indicative of the instantaneous weight of materials on the track portion 12 of the conveyor system. Once this is accomplished, the instantaneous signal can be integrated over a period of time to develop a signal which is indicative of the total weight of materials having passed along the conveyor track 12 for a given period of time.

A block diagram of the load cell and control circuitry utilized to effect the above result is shown in FIG. 2. In particular, a load cell 21 develops a DC output signal which is received at a circuit junction point 22. A potentiometer 23, likewise develops a DC signal at the circuit junction point 22. Since it is desirable to have a zero output signal at the circuit junction point 22 when the load of the conveyor is zero, the balance adjusting mechanism 23 allows the introduction of an opposite polarity signal for cancelling out the tare weight of the conveyor itself thereby developing the desired zero output signal at no-load conditions.

The output signal at the junction point 22 is coupled to an amplifier 24 which has input and output terminals 25 and 26, respectively. The amplifier 24 has an integrating capacitor 27 coupled in parallel therewith, and a switch 28 is coupled across the capacitor 27.

The output of the amplifier 24 is then coupled to the input 29 of a differential amplifier 30. A potentiometer 31 provides a calibration signal which is coupled to a second input 32 of the differential amplifier 30.

Since the amplifier 30 is designed to switch states at a predetermined level of charge developed on the capacitor 27, adjustment of the calibration potentiometer 31 provides a means for varying the charge level of the capacitor 27 at which the differential amplifier will switch from a first state of operation to a second state of operation.

The switching of states of operation of the differential amplifier 30 accomplishes two functions. First, the output of the amplifier 30, namely, the output 33, is coupled to a further amplifier 34 and hence to a counting mechanism 35. The counter will register each time the differential amplifier 30 produces an output signal due to the switching of the state of operation thereof.

The second function performed by the switching of the state of the differential amplifier 30 is to discharge the capacitor 27. This is accomplished by means of a device 36 which may take the form of a relay or the like which is coupled to the switch 28. Accordingly, when a signal is received at the output 33 of the amplifier 30, the relay 36 is actuated and the switch 28 is closed, thereby discharging the capacitor 27. In this way, the capacitor 27 is repeatedly discharged at the same time that the counter 35 registers one unit of weight. In this way, the capacitor 27 may be thought of as accumulating the weight information until a specific weight has passed over the conveyor and then releasing the weight information to the counter for storage, while the cycle is repeated until the weighing operation ceases.

A second differential amplifier 37 may be coupled to the output of the capacitor 27 as at circuit junction point 38. The amplifier 37 has a voltage supply input resistor 39 and output terminals 40 and 41 which may be coupled across a meter 42. The differential amplifier and meter arrangement 37 and 42 is utilized to detect the presence of zero signal level at the circuit junction point 22 corresponding to a balance condition for the load cell output at no-load. The potentiometer 23 may be adjusted until such time as the meter indicates a zero output signal at the circuit junction point 22.

The schematic of FIG. 3 shows the detail of the circuitry illustrated in the block diagram of FIG. 2. In particular, the load cell 21 consists of a primary winding 43 which is coupled to two secondary windings 44 and 45. A movable armature 46 is constructed in position to be movable in accordance with the weight of materials received at the load cell and hence to vary the output signal at the secondaries 44 and 45.

An oscillator which includes a transistor 47 has an input voltage supply coupled to a point 48 and through a resistor 49 to the emitter thereof. A parallel combination of a capacitor 50 and resistor 51 is coupled in the base circuit of the transistor 47, and a capacitor 52 is coupled across the base and collector terminals thereof. Also, the capacitor 52 is coupled to two contact pins 53 and 54 which have the primary winding 43 of the load cell coupled directly thereacross. Accordingly, the primary winding 43 acts as the primary of the load cell output transformer and also as the inductance element for the oscillator 47. The output of the oscillator is approximately 2,500 Hz.

The secondary windings 44 and 45 have diodes 55 and 56 connected in series therewith to provide full wave rectification of the output signal between terminals 57 and 58. The rectified output signal at the terminals 57 and 58 is coupled through resistors 59 and 60 with capacitors 61 and 62 connected to ground as shown. The voltage supply for the oscillator and load cell arrangement is coupled across terminals 63 and 64 as shown.

The output of the load cell is coupled to a circuit junction point 65 which is the summing point for the load cell output signal and the balance signal. The balance signal is achieved through a potentiometer 66 which has a movable contact 67 and a coupling resistor 68 which couples the current signal from the potentiometer 66 to the summation point 65.

The signal at the summation point 65 is coupled to a base terminal 69 of a transistor 70. The transistor 70 is coupled in a differential amplifier arrangement with a second transistor 71. In particular, the emitter 72 of the transistor 70 is coupled directly to the emitter 73 of the transistor 71, and both emitters are coupled through a resistor 74 to ground at circuit junction point 75. The transistor 70 is supplied through a connection 76 to the base thereof, while the transistor 71 is supplied through a connection 77 and a coupling resistor 78 to the base of that transistor.

The collector of the transistor 71 is coupled at point 79 to a base connection 80 of a transistor 81. The transistor 81 is supplied at its emitter 82 and has its collector 83 coupled through a resistor 84 to ground at circuit junction point 85. A resistor 86 and capacitor 87 are connected in series from the collector 83 to the base 80 as shown.

A further amplifier stage consists of a transistor 88. The output of the transistor 81 is coupled to the base 89 of the transistor 88. The transistor 88 is supplied at its collector connection 90 and has an emitter 91 grounded through a resistor 92 as at circuit junction point 93.

The output of the amplifier 88 is taken from the emitter 91 and coupled through a switch 94 to a first terminal 95 of an integrating capacitor 96.

The input signal to the transistor 70 as found at the circuit junction point 65 is coupled through a circuit line 97 to a second terminal 98 of the integrating capacitor 96.

Under no-load conditions, the transistor 71 is operating at maximum level. The output of transistor 71 is amplified through transistors 83 and 88 and applied to the terminal 95 of the integrating capacitor 96. As the load on the load cell increases, the voltage at the input summing point 65 increases thereby increasing the drive for the transistor 70 and decreasing the drive of the transistor 71. Accordingly, charge developed across the capacitor 96 is dependent on the differential signal as developed through the output of the transistor 71 and applied to the terminal 95 and as developed at the input of the transistor 70 at point 65 and applied through the line 97 to the terminal 98 of the capacitor 96. In this way, the rate of charge of the capacitor 96 will be dependent on the loading of the load cell.

If it is desired to balance the network, the switch 94 may be moved to the terminal 99 which is coupled through a resistor 100 and a meter 101 to a supply line 102. When zero input signal appears at the summation point 65, and the transistor 71 is operating at maximum, a signal appears at the emitter 91 of the transistor 88 which approximately balances the signal applied at the terminal 102 of the meter 101. Accordingly, the meter 101 will read the null condition. Once null condition has been achieved by adjusting the contact 67, the switch 94 can be returned to the position shown in the drawing for operation of the circuit.

The terminal 95 may be said to be the output of the capacitor 96 and is identical to a circuit point 103. A supply terminal 104 is coupled through a resistor 105 to the terminal 103. Also, the terminal 103 is coupled through a resistor 106 to the base connection of the transistor 77. The base connection of transistor 71, being coupled through a resistor 107 to a voltage supply at a terminal 108.

The capacitor 96 output terminal 95 or 103 is coupled to a base 109 of a transistor 110. Transistor 110 has a collector coupled to a voltage supply at junction point 111 and has an emitter 112 coupled to an emitter 113 of a further transistor 114. The transistors 110 and 114 are coupled at a differential amplifier and have a capacitor 115 and a resistor 116 connected in parallel from the emitters thereof to ground at circuit junction point 117. The collector 118 of the transistor 114 is coupled to a supply line at circuit junction point 119 through a resistor 120.

The collector 118 of the transistor 114 is coupled to a base connection 121 of a transistor 122. The transistor 122 has an emitter 123 coupled to a voltage supply line at terminal 124, and has a collector 125 coupled to a circuit junction point 126.

The collector output of the transistor 122 as found at the terminal 126 is coupled through a resistor 127 to a base 128 of a further switching transistor 129. The switching transistor has its collector 130 and its emitter 131 coupled directly across the capacitor 96. A resistor 132 is interposed between the collector 130 and the terminal 98 of the capacitor 96. The base 128 is coupled through a resistor 133 to a supply line at terminal 134.

In operation, when the charge on the capacitor 96 reaches a predetermined level, the transistor 110, which would have been conducting, is turned "off", and the transistor 114 is rendered conducting, which in turn, turns "on" of the transistor 122. The turning "on" of the transistor 122 then couples a pulse signal across a coil 135 to a counting mechanism 136. A diode 137 is coupled between ground at 138 and the collector 125 of the transistor 122.

At the same time that the counter has been actuated, the signal developed at the collector connection 126 of the transistor 122 is coupled to the transistor 129 for turning "on" the same. The turning "on" of the transistor 129 short circuits the capacitor 96. The capacitor 96 is accordingly discharged. The resistor 132 prevents loading of the transistor 129 during this discharge interval.

A pair of capacitors 139 and 140 are coupled from the junction point 126 through a resistor 141 to the base connection 142 of the transistor 114 and to ground at 143 through a capacitor 144. The capacitors 139 and 140 have the function of holding "on" the transistor 122 until the capacitor 96 has time to completely discharge.

A calibration device to effect the charge level on the capacitor at which the differential amplifier 110—114 will switch state of operation includes a potentiometer 145 which is coupled through a resistor 146 to ground at terminal 147. The potentiometer 145 is also coupled through a resistor 148 to circuit junction point 149 which corresponds to the circuit junction point 126 at the collector of the transistor 122. Essentially, by adjusting the pointer 150 of the potentiometer 145, the level of charge on the capacitor 96 prior to discharge thereof can be increased or decreased thereby increasing or decreasing the weight corresponding to one count at the counter 136.

It will be apparent to those skilled in the art that various combinations and modifications of the features of this invention may be accomplished by those skilled in the art, but I desire to claim all such modifications and combinations as properly come within the spirit and scope of my invention.

I claim:

1. A control circuit for measuring the weight of materials moving at a constant speed through a conveyor means comprising:
- a load cell coupled to said conveyor and supporting the same, said load cell having a transformer for developing an output signal indicative of the weight of materials on said conveyor means;
- an oscillator having an inductive portion, said inductive portion of said oscillator comprising the primary of said output transformer, means for continually integrating said output signal, said integrating means having a given no-load output level; and
- counter means, means responsive to a predetermined magnitude of said integrated output signal for triggering said counter means and for substantially simultaneously restoring said integrating means to said no-load level.

2. A control circuit in accordance with claim 1 wherein rectifying means are coupled to the output of said transformer for generating a DC signal, said DC signal being coupled to the input of said integrating means, said integrating means developing a continuously increasing signal thereon prior to the operation of said triggering means.

3. A control circuit in accordance with claim 2 wherein a balancing means is coupled to the input of said integrating means, said balancing means providing an independent and variably adjustable DC input signal to said integrating means for algebraically combining with said DC output signal of said transformer, whereby said balancing means provides a null means for eliminating the effects of tare weight on said integrating means.

4. A control circuit for measuring the weight of materials moving at a constant speed through a conveyor means comprising:
- a load cell coupled to said conveyor and supporting the same, said load cell having a transformer for developing an output signal indicative of the weight of materials on said conveyor means, an oscillator having an inductive portion, said inductive portion of said oscillator comprising the primary of said output transformer, means for continually integrating said output signal, said integrating means having a given no-load output level;
- counter means;
- a differential amplifier, said differential amplifier being coupled to said integrating means and being responsive to a given summation signal for switching its amplifier state, said counter means being coupled to said differential amplifier; and
- means responsive to the switching of the state of operation of said differential amplifier for restoring said integrating means to said no-load output level.

5. A control circuit in accordance with claim 4 wherein said integrating means comprises a capacitor coupled to the output of said transformer, switching means being coupled in parallel with said capacitor and means responsive to the switching of states of said differential amplifier means for closing said switching means, thereby discharging said capacitor to its no-load output level.

6. A control circuit in accordance with claim 4 wherein an adjustable DC signal means is coupled to said differential amplifier for controlling the level at which said integrating means causes said differential amplifier to switch its state of operation.